(12) United States Patent
Fahling et al.

(10) Patent No.: US 7,883,327 B2
(45) Date of Patent: Feb. 8, 2011

(54) DEVICE FOR PRODUCING BLOWN FILM

(76) Inventors: Gerd Fahling, Dambroicher Strasse 36, 53773 Hennef (DE); Richard Zimmerman, Kreuzbergstrasse 6, 53127 Bonn (DE)

( * ) Notice: Subject to any disclaimer, the term of this patent is extended or adjusted under 35 U.S.C. 154(b) by 1377 days.

(21) Appl. No.: 10/875,519

(22) Filed: Jun. 24, 2004

(65) Prior Publication Data

US 2005/0285315 A1    Dec. 29, 2005

(51) Int. Cl.
*B29C 47/90* (2006.01)
(52) U.S. Cl. ............ 425/72.1; 425/74; 425/326.1; 425/380
(58) Field of Classification Search .......... 425/72.1, 425/73, 326.1, 380, 467, 74
See application file for complete search history.

(56) References Cited

U.S. PATENT DOCUMENTS 3,888,609 A * 6/1975 Saint Eve et al. .......... 425/72.1
4,473,527 A * 9/1984 Fujisaki et al. ............ 264/566
4,828,770 A * 5/1989 Fabian et al. ............. 264/40.3
6,273,699 B1 * 8/2001 Finke ...................... 425/72.1
6,293,778 B1 * 9/2001 Joseph .................... 425/72.1

FOREIGN PATENT DOCUMENTS

FR    1523782    * 3/1968

* cited by examiner

*Primary Examiner*—Yogendra N Gupta
*Assistant Examiner*—Joseph Leyson
(74) *Attorney, Agent, or Firm*—Douglas C. Wyatt

(57) ABSTRACT

An apparatus for the manufacture of a thermoplastic blown film is provided having a blower head for extruding a film tube of a thermoplastic material. An annular ring is provided for blowing a cooling gas on an outside surface of the film tube to solidify the film tube. This cooling gas is directed in a flow direction parallel to a wall of the film tube. The cooling gas is drawn off the tube by means of a suction ring positioned around the tube prior to flattening the tube to form a film tube.

17 Claims, 4 Drawing Sheets

DEVICE FOR PRODUCING BLOWN FILM

FIELD OF INVENTION

The invention relates to a process of and a device for sucking off cooling gas for a film tube during the production of blown film, wherein the film tube, after having left the annular nozzle of a blowing head, is substantially annularly blasted with cooling gas from the outside either radially or in parallel with the wall. The cooling gas used is normally cooling air. However, for certain applications, it is possible to use inert gas. The cooling gas can emerge from a cooling gas ring in several planes and in different quantities, and it is possible to combine a fixed cooling gas flow and a controllable cooling gas flow. A process of and a device for said type are described in the applicant's DE 100 29 175 A1 for example.

BACKGROUND OF INVENTION

From U.S. Pat. No. 6,273,699 B1 there is known a device for conditioning a film tube during the production of blown film, which device comprises a plurality of closed annular sections along the film tube; the sections each comprise a ring of air ejection nozzles extending parallel to the longitudinal direction of the film tube, and at a distance therefrom they comprise a ring of air suction nozzles directed in the opposite direction, with the former extending in the direction of production and the latter in the direction opposed to the direction of production of the film tube.

DE 44 05 463 proposes a process and device for cooling a film tube extruded from a film blowing head, wherein cooling air is blown out of a cooling ring with an annular exit gap, which cooling ring encloses the tube and wherein cooling air is sucked out of a screened space surrounding the tube, at a distance from the cooling ring in the direction of production of the tube at an annular aperture.

SUMMARY OF THE INVENTION

During the production or extrusion of blown film, a thermoplastic material is pressed via an extruder into a blowing head out of whose annular nozzle or annular channel there emerges a film tube which is drawn upwards. The hot film tube is subjected to an internal excess pressure and immediately after having left the annular nozzle, it is substantially annularly blasted with cooling gas from the outside and optionally also from the inside, and thus cooled. From the moment of leaving the annular nozzle, after a film tube expansion phase, the thermoplastic material substantially solidifies, whereafter the film tube substantially retains its diameter. The place of solidification is referred to as the "freezing limit". After the film tube has solidified, it is guided in the longitudinal direction via a calibrating basket and a flattening device and squeezed and pulled off in the form of a flat tube by an extraction device. The calibrating basket is positioned above the freezing limit. The diameter of the film tube and thus the subsequent film width is variable and is varied by the internal excess pressure in the film tube and via the setting of the adjustable calibrating basket.

During the production of blown film tube, after the hot tube material has left the annular nozzle, in the region of extraction of the film tube as far as the freezing limit, monomer-containing gases emerge from the thermoplastic material. Said gas emissions are carried along by the passing cooling gas in the direction of production and are deposited in the form of a wax-like coating on all plant elements following the blowing head in the direction of extraction such as the calibrating basket, the flattening device and the extraction tool as well on devices in the direct vicinity. Floating particles in the environment form additional dirt deposits on the sticky wax-like coating. Such wax and dirt deposits obstruct the production process of the film tube and adversely affect accurate functioning of the plant elements and thus the product quality. Particularly in the case of medical film and film for the food industry, the transfer of dirt deposits to the film tube leads to unacceptable quality defects. Therefore, it has so far been necessary for said plant elements to be cleaned regularly and extensively, wherein as a rule, access to said plant elements was complicated. Furthermore, it is suspected that breathing-in cooling gas contaminated with gas emissions in the gaseous phase is detrimental to a person's health.

OBJECT OF THE INVENTION

It is therefore the object of the present invention to provide a process and device of said type by means of which contamination of the plant elements by exhaust gas deposits can be reduced or avoided. The objective is achieved by a process of said type which is characterised in that the cooling gas contaminated with gas emissions out of the tube material is substantially annularly sucked off again on the outside of the film tube in the direction of extraction of the film tube downstream from the cooling gas supply, and by a device wherein at a distance from the cooling gas ring, above same (downstream), there is arranged a gas suction ring which encloses the film tube and comprises internal, substantially annularly arranged suction nozzles. Such means make it possible to suck off the cooling gas contaminated with gas emissions near their origin, thus avoiding or reducing the contamination of the subsequent plant components and reducing the health risk.

According to a first embodiment of the invention it is proposed that, downstream from the freezing limit, but already upstream from a calibrating phase, the contaminated cooling gas is sucked off. The gas sucking-off ring is arranged between the freezing limit and the calibrating device, without obstructing the film tube cooling operation up to the point of reaching the freezing limit. This is particularly advantageous with a view to protecting the calibrating device and the subsequent plant components from contamination.

According to a second embodiment it is proposed that the contaminated cooling gas is sucked off in the region of the calibrating phase of the film tube, i.e. that the gas sucking-off ring or several gas sucking-off beams are arranged in the region of the calibrating device for the film tube. This means that even in the region of the open structure of a calibrating basket, contaminated cooling gas can be sucked off in such a way that the components of the adjusting devices of the calibrating device can also be protected from contamination.

According to a third embodiment, it is proposed that the contaminated cooling gas is sucked off downstream from a calibrating phase of the film tube. This means that the gas sucking-off ring is arranged above (downstream from) a calibrating device for the film tube.

According to a preferred embodiment it is proposed that the film tube is sealed annularly directly downstream from the suction point relative to the suction means. The respective device comprises a diaphragm which is arranged directly above (downstream from) the gas sucking-off ring and which annularly seals the film tube relative to the gas sucking-off ring. On the one hand, this measure improves the effectiveness of the suction process and, on the other hand, it fully protects the subsequent plant components such as the flattening device, from being contaminated. The diaphragm can be provided in the form of an adjustable iris diaphragm.

More particularly, it is proposed that the iris diaphragm is provided with automatic control means for adapting the diaphragm diameter to the diameter of the film tube. The diameter of the film tube can be continuously recorded by contact-free ultrasound measurements. It is thus possible to compensate for slight diameter fluctuations of the film tube in the course of production and to avoid manual adaptation measures during production changes.

More particularly, it is proposed that the plurality of suction beams are connected to a segmented, adjustable calibrating device.

In a simple embodiment of the process, the sucked-off contaminated cooling gas can be blown into the environment outside the production hall. However, in view of environmental protection measures it is preferred to filter the cooling gas contaminated with gas emissions before it is blown out either inside or outside the production hall. For this purpose, more particularly, there is provided an electric filter in a suction line in front of the suction fan.

If the film tube production facilities include additional internal cooling, the contaminated, sucked-off cooling gas from the inner cooling operation can be combined with the contaminated cooling gas of the outer cooling operation and filtered together therewith.

According to a further process improvement, it is proposed that, downstream from the suction point of the contaminated cooling gas, the film tube, for being cooled subsequently, is again blasted in a substantially annular way with cooling gas, i.e. that directly above (downstream from) the gas sucking-off ring, there is arranged a further cooling gas ring. In this context, it is proposed that the renewed operation of blasting the film tube with cooling gas takes place downstream from the annular sealing region in that the further cooling gas ring is arranged directly above (downstream from) the diaphragm. Such means allow subsequent cooling of the still relatively warm film tube, such subsequent cooling allowing continued interference-free handling of the film tube, more particularly flattening same and winding same up on a coil.

As the already heated cooling air flowing along the film tube is sucked off completely from the film tube at the suction ring, the additionally blasted cooling gas reaches the film tube without any obstructions from a flow-technological point of view and has a high subsequent cooling effect because it is not mixed with the heated cooling gas. This ensures a high production output in high-performance production facilities and those with a low building height.

The quantity of sucked-off contaminated cooling gas can be automatically adapted to the quantity of cooling gas freshly supplied directly after the film tube emerges from the annular nozzle. For this purpose, it is necessary to provide a suitable control device.

The inventive devices are particularly advantageous in that they can easily be adapted to different film tube diameters, more particularly in the region where the suction ring mentioned first is sealed relative to film tube by means of an adjustable diaphragm and in the region of the calibrating device by combining individual suction beams or suction funnels with the segments of an adjustable calibrating device.

According to a further advantageous embodiment, it is possible to structurally connect the suction ring mentioned first, the diaphragm and the additional cooling ring in such a way that the assembly requires only one single common suspension facility in the plant frame.

Preferred embodiments of the invention are illustrated in the drawings and will be described below.

DETAILED DESCRIPTION OF THE INVENTION

Figure 1:
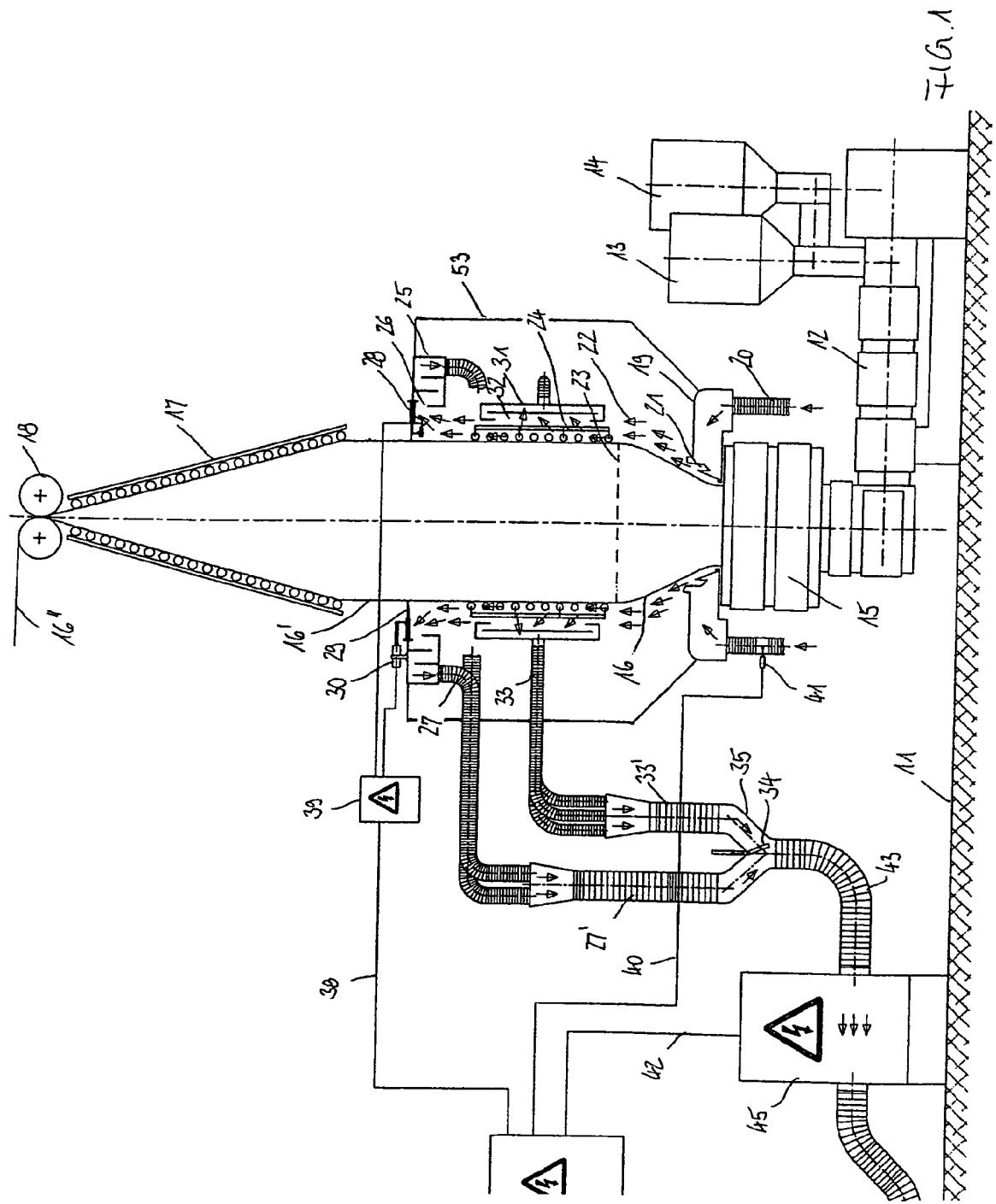
FIG. 1 shows a film blowing plant in accordance with the invention in a first embodiment illustrating the entire system.

In a side view and partially in a longitudinal section through the axis of a blown film tube, FIG. 1 shows a plant for carrying out the inventive process, including the characteristics in accordance with the invention. On a machine foundation 11, there is erected an extruder 12 comprising two charging hoppers 13, 14 for thermoplastic material. Thermoplastic material introduced in granular form through the hoppers 13, 14 is plasticized and homogenised by the pressure means and additional heating means in a worm of the extruder 12 and pressed into a blowing head 15 with a vertical axis, which follows the extruder. At its upper end, the blowing head 15 comprises an annular nozzle (not identifiable in detail) from which there emerges a expanding axis-symmetrical film tube 16 initially consisting of a still plasticized film material. After the material has solidified, the film tube 16' substantially retains its diameter. The film tube 16' is flattened in a flattening device 17 and extracted upwards by an extraction device 18. Subsequently, the flattened film tube 16" is wound up on coils. In the direction from the blowing head 15 to the extraction device 18, the functional terms "upstream from" and "downstream from" are used to mean in a spatial relationship "underneath" and "above".

Directly above the blowing head 15, there is shown a cooling gas ring 19 with several gas supply lines 20. The cooling gas ring 19 comprises internal exit nozzles 21 out of which there flows the cooling gas and, substantially annularly and parallel to the wall, flows against the film tube 16 which is subjected to an increased internal pressure. The cooling gas flow is symbolised by arrows 22. Under said internal excess pressure, the diameter of the film tube 16 plasticized in this region, until the film tube 16 hardens under the effect of the cooling gas and assumes a constant diameter. The place of transition from the plasticized material to the hardened material is referred to as the "freezing limit" and has been given the reference number 23. Above, i.e. in the direction of extraction downstream from the freezing limit 23, there is arranged a calibrating device 24 which contains roller assemblies which are positioned one above the other and which are positioned substantially annularly around the film tube 16'. To permit adaptation to film tubes with different diameters, the roller assemblies, as a rule, are located on individual pivotable segments forming circumference parts, by means of which segments the diameter of the calibrating device can be changed. In a cross-sectional view, said segments, in a simplified way, can form a polygonal calibrating device. The still relatively warm film tube 16' is stabilised in its cross-section by the calibrating device.

Downstream from the calibrating device 24, there is provided an inventive gas sucking-off ring 25 with internal annular suction apertures 26, which ring 25 can suck off the cooling gas contaminated with gas emissions from the film tube. Circumferentially distributed suction lines 27 are connected to the gas sucking-off ring 25. The cooling gas contaminated with gas emissions is indicated by arrows 28. Directly downstream from the gas sucking-off ring 25, there is provided an adjustable diaphragm 29 which is mechanically connected to said ring 25 and which sealingly encloses the film tube 16'. The diaphragm 29 is adjustable by an adjusting device 30 in the aperture cross-section and can therefore be adapted to different diameters of the film tube 16'. By sealing the film tube above the gas sucking-off ring 25, pure air is prevented from being sucked in from a region downstream from the gas sucking-off ring, so that the process of sucking off the contaminated cooling gas is optimised while keeping the energy consumption low. In the region of the calibrating device 24, radially outside the calibrating device, there is provided a further gas sucking-off ring or a plurality of individual gas sucking-off funnels or gas sucking-off beams 31 which are connected to a plurality of circumferentially distributed suction lines 33. One gas sucking-off beam each can be associated with one of the above-mentioned segments, so that an adaptation of the calibrating device to different diameters of the film tube 16' can be accompanied by an adaptation of the additional suction device to the different diameters. The plurality of suction lines 27 is first joined to form a line 27'. Equally, the plurality of suction lines 33 is then combined to form one single line 33'. The lines 27' and 33' are then combined to form one single gas sucking-off line 43, with the control flap 34 being arranged in the region of a Y-pipe. The suction pipe 43 is followed by a suction fan 44. In the suction line 43, in front of the suction fan 44, there can be integrated a filter, more particularly an electric filter, if, for environmental reasons, it is impossible to blow the gas emissions into the environment outside a production hall. A control device 36 with a processor controls via a control line 37 the suction fan 44 and, via a control line 38, a further control device 39 for controlling the adjusting device 30 for the diaphragm 29. Via a measuring line 40, the signals of a cooling gas quantity sensor 41 are transmitted in the cooling air supply lines 20 to the control device 36. Via the measuring line 42, the signals on the pressure and flow quantity conditions at the electric filter 45 are transmitted to the control device 36. Via a further control line (not illustrated), the control device 36 can regulate the cooling gas fan (not illustrated either) in a processor-controlled way. The entire region from the first cooling gas ring 10 to the gas sucking-off ring 25 is enclosed by a casing 53, so that the cooling gas contaminated with gas emissions is kept clear of the working area of the operatives. The lines 27, 33 are sealed by the casing.

Figure 2:
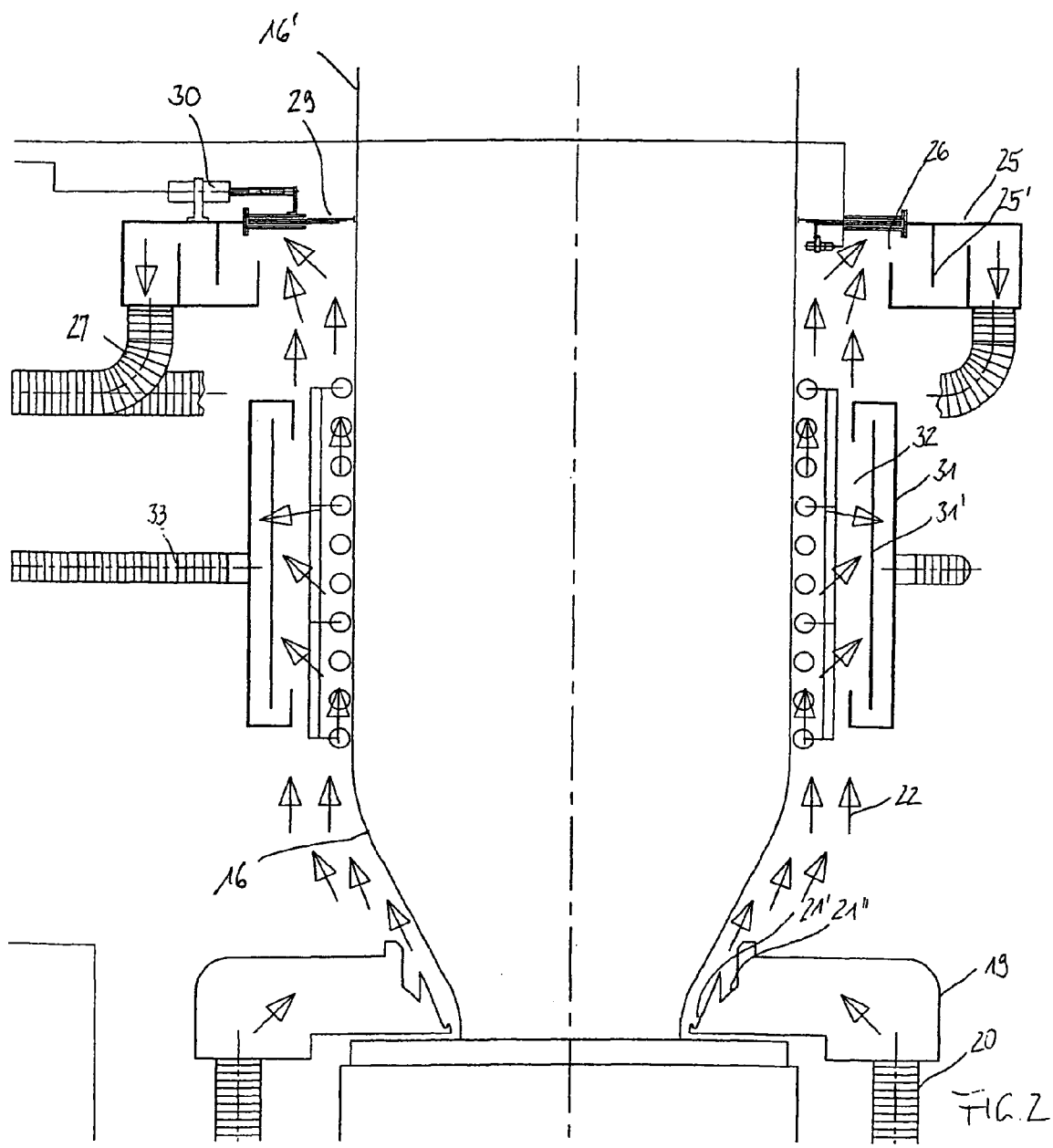
FIG. 2 shows parts of the plant according to FIG. 1 in an enlarged illustration.

In FIG. 2, the details identical to those shown in FIG. 1 have been given the same reference numbers. To that extent, reference is made to the preceding description. In this Figure it is indicated that the cooling gas ring 19 comprises two exit nozzles 21', 21". It can also be seen that in the suction ring 25, there are provided labyrinth elements 25' in order to level out the pressure level at the suction aperture 26 across the circumference and to suppress the influence of the individual gas sucking-off lines 27. It can also be seen that in the gas sucking-off beams 31 there are provided facilities 31' in order to calm the pressure level in the gas inlet aperture 32.

Figure 3:
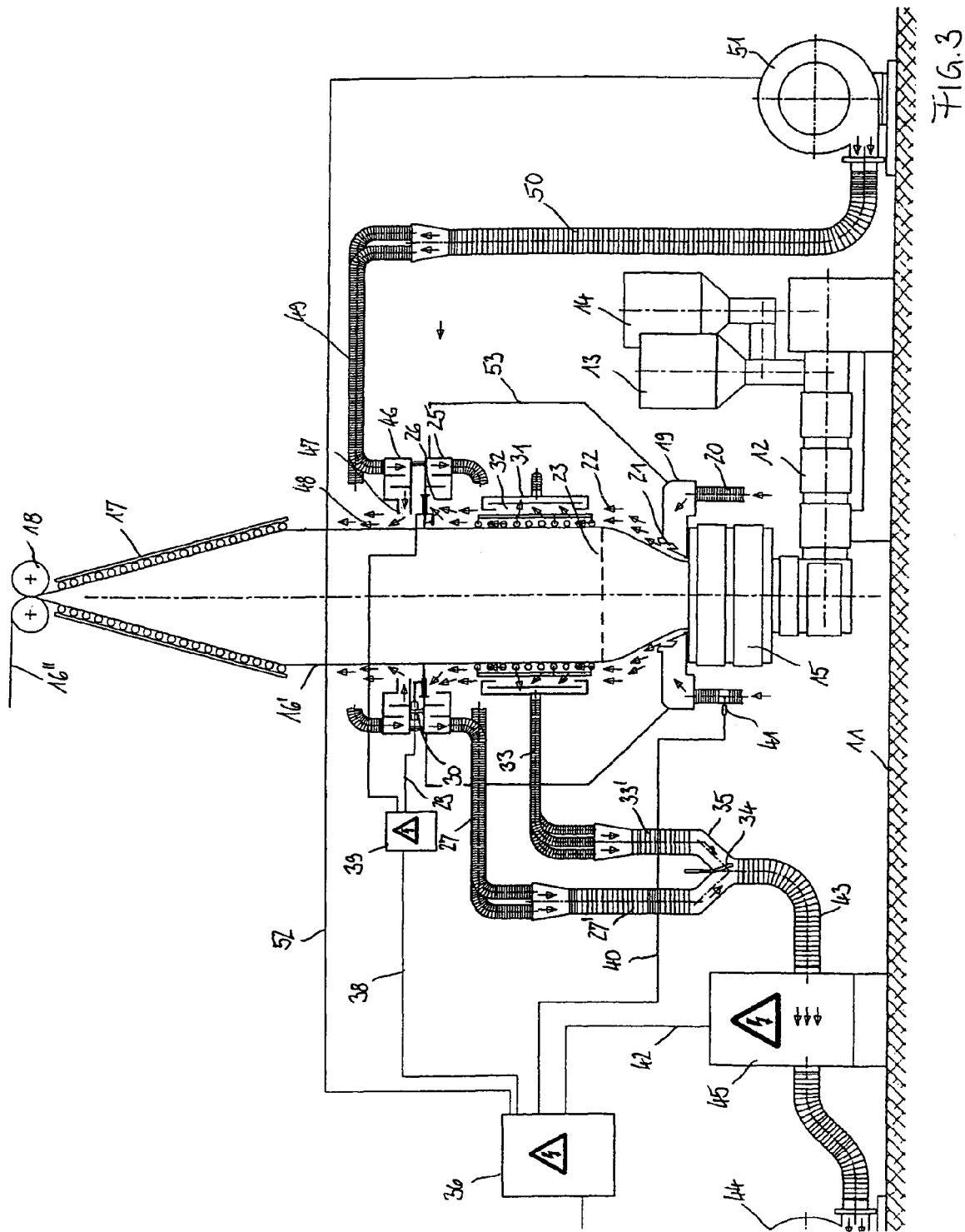
FIG. 3 shows a film blowing plant in accordance with the invention in a second embodiment illustrating the entire system.

In FIG. 3, the details identical to those shown in FIG. 1 have been given the same reference numbers and have the same function as described above. In addition to the details described in FIG. 1, there can be identified a further cooling gas ring 46 which, via inner exit nozzles 47, blows cooling gas for subsequent cooling purposes substantially radially against the film tube 16'. The additional cooling gas streams are indicated by arrows 48. Gas supply lines 49 which, in total, are supplied via a supply line 50 by a further cooling gas pressure fan 51 are connected to an additional cooling gas ring 46. The cooling gas pressure fan 51 is controlled via a control line 52 by the control device 36. The still relatively warm film tube 16' can thus be re-cooled, so that the flattening assembly 17 and the extraction device 18 can be made to operate without the risk of the film layers sticking during the flattening operation. In this embodiment, too, the region from the first cooling gas ring 19 to the gas sucking-off ring 25 is enclosed by a casing 33, which sealingly adjoins said parts and which prevents the working environment from being subjected to cooling gas contaminated with gas emissions.

Figure 4:
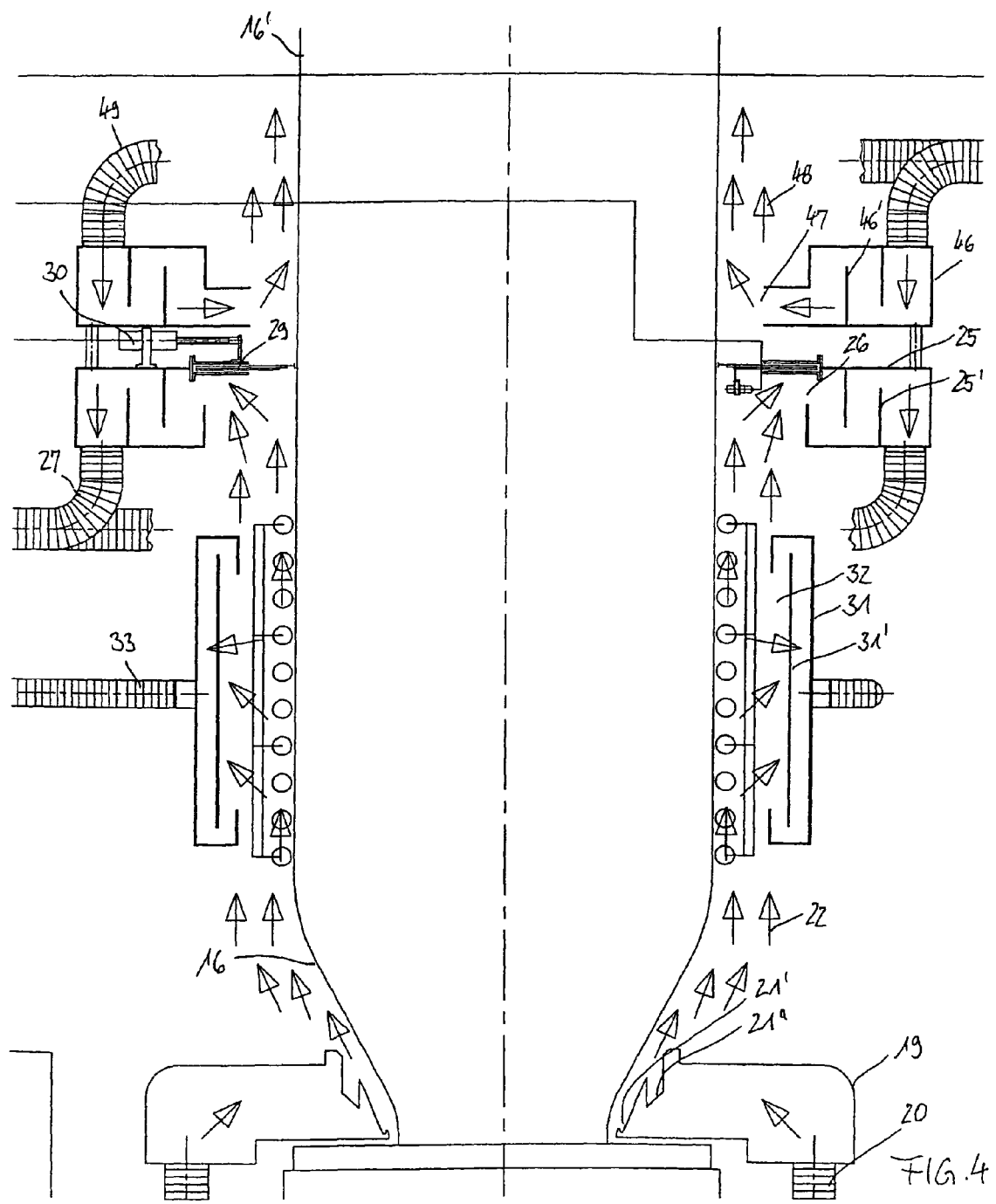
FIG. 4 shows parts of the plant according to FIG. 3 in an enlarged illustration.

In FIG. 4, the details identical to those shown in FIG. 3 have been given the same reference numbers. To that extent, reference is made to the above description. It is indicated that the cooling gas ring 19 comprises two exit nozzles 21', 21". Furthermore, it can be identified that labyrinth elements 25' are provided in the suction ring 25 in order to unify the pressure level at the suction aperture 26 around the circumference and to suppress the influence of the individual gas sucking-off lines 27. It can also be seen that in the gas sucking-off beams there are provided elements 31' in order to calm the pressure level in the gas inlet apertures 32. Finally, the additional cooling gas ring 46 is provided with labyrinth elements 46' to unify the additional cooling gas stream at the exit nozzle 47. The assemblies of suction ring 25, diaphragm 29 and additional cooling gas ring 46 are structurally connected to one another.

The invention claimed is:

1. An apparatus for the manufacture of a thermoplastic blown film comprising:
a blower head (15) for extruding a film tube (16) of a thermoplastic material; an annular ring (19) for blowing a cooling gas on an outside surface of said film tube to solidify said film tube, said annular ring adapted to direct the cooling gas at said tube in a flow direction parallel to a wall of said film tube; and, further comprising a calibrating device (24) for the film tube (10) and a suction ring around said film tube to draw off said cooling gas, said suction ring being arranged in a region of said calibrating device (24), wherein the calibrating device (24) is a segmented adjustable calibrating device.

2. The apparatus according to claim 1 wherein said suction ring (25) has a plurality of substantially annularly arranged suction nozzles (26).

3. The apparatus according to claim 1 wherein said annular ring (19) has an internal substantially annular cooling gas exit (21).

4. An apparatus for the manufacture of a thermoplastic blown film tube comprising:
a blower head (15) for extruding a film tube (16) of a thermoplastic material;
an annular ring (19) for blowing a cooling gas on an outside surface of said film tube to solidify said film tube, said cooling gas being directed at said film tube in a flow direction parallel to a wall of said film tube; further comprising a calibrating device (24) for the film tube (10) and a plurality of suction beams around said film tube to draw off said cooling gas, said plurality of suction beams being arranged in a region of said calibrating device (24), wherein the calibrating device (24) is a segmented adjustable calibrating device, and wherein the plurality of suction beams (31) are connected to the segmented adjustable calibrating device.

5. The apparatus according to claim 4 wherein the plurality of suction beams (31) are positioned in the region of said calibrating device (24) radially outside the calibrating device.

6. The apparatus according to claim 1 further comprising a diaphragm (29) disposed above the suction ring, wherein said diaphragm is adapted to annularly seal the film tube (16) relative to the suction ring.

7. The apparatus according to claim 6 wherein the diaphragm (29) is an adjustable iris adapted to be adjusted to fit the diameter of the film tube.

8. The apparatus according to claim 1 wherein a diaphragm (29) is provided above the suction ring (25) and a second cooling gas ring (46) is provided above the diaphragm (29).

9. The apparatus according to claim 1 further comprising a controlling device (36) for controlling the amount of contaminated cooling gas to be suctioned off.

10. The apparatus according to claim 1 further comprising an inner film tube cooling system and a suction line for removing cooling gas from the inside of the film tube is combined with a suction line for removing the cooling gas from the outside of the film tube.

11. The apparatus according to claim 1 further comprising a filter (45), a gas suction line (43), and a suction fan (44), wherein the filter (45) is arranged in said gas suction line (43) in front of said suction fan (44).

12. The apparatus according to claim 1 wherein said annular ring (19) comprises a first cooling gas ring (19), and further comprising a casing (53) adapted for sealing the flow of cooling gas from the first cooling gas ring (19) to the suction ring (25).

13. The apparatus according to claim 4 wherein a diaphragm (29) is provided above the plurality of suction beams (31) and a second cooling gas ring (46) is provided above the diaphragm (29).

14. The apparatus according to claim 4 further comprising a controlling device (36) for controlling the amount of contaminated cooling gas to be suctioned off.

15. The apparatus according to claim 4 wherein there is an inner film tube cooling system and a suction line for removing cooling gas from inside of the film tube is combined with a suction line for removing the cooling gas from outside of the film tube.

16. The apparatus according to claim 4 further comprising a filter (45), a gas suction line (43), and a suction fan (44), wherein the filter (45) is arranged in said gas suction line (43) in front of said suction fan (44).

17. The apparatus according to claim 4 wherein said annular ring (19) comprises a first cooling gas ring (19), and further comprising a casing (53) adapted for sealing the flow of cooling gas from the first cooling gas ring (19) to the plurality of suction beams (31).

* * * * *